United States Patent
Tresse et al.

(10) Patent No.: US 10,507,486 B2
(45) Date of Patent: Dec. 17, 2019

(54) SUPPORT APPARATUS FOR PART IN PAINTING PROCESS

(71) Applicant: Compagnie Plastic Omnium, Lyons (FR)

(72) Inventors: David Tresse, Saint-Andre de Corcy (FR); Marc Helmreich, Courtenay (FR); Bernard Lauture, La Frette sur Seine (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 15/471,536

(22) Filed: Mar. 28, 2017

(65) Prior Publication Data
US 2018/0281013 A1  Oct. 4, 2018

(51) Int. Cl.
| | |
|---|---|
| *B05C 13/02* | (2006.01) |
| *B25J 11/00* | (2006.01) |
| *B65G 47/52* | (2006.01) |
| *B05B 13/02* | (2006.01) |
| *B05B 16/00* | (2018.01) |
| *B05B 16/20* | (2018.01) |

(52) U.S. Cl.
CPC .......... *B05C 13/02* (2013.01); *B05B 13/0221* (2013.01); *B05B 13/0285* (2013.01); *B05B 16/90* (2018.02); *B25J 11/005* (2013.01); *B65G 47/52* (2013.01); *B05B 16/20* (2018.02)

(58) Field of Classification Search
None
See application file for complete search history.

(56) References Cited

U.S. PATENT DOCUMENTS

| | | | |
|---|---|---|---|
| 7,445,184 B1 * | 11/2008 | Johnson | B05B 13/0285 248/176.1 |
| 2004/0222179 A1 | 11/2004 | Garcia | |
| 2008/0142652 A1 | 6/2008 | Johnson | |
| 2015/0283569 A1 | 10/2015 | Linares | |

FOREIGN PATENT DOCUMENTS

| | | |
|---|---|---|
| DE | 102011017347 A1 | 10/2012 |
| EP | 1221402 A1 | 7/2002 |
| WO | WO-2010/009476 A1 | 1/2010 |

OTHER PUBLICATIONS

European Search Report dated Nov. 16, 2016 for corresponding European Patent Application No. EP17181213.

\* cited by examiner

*Primary Examiner* — Michael P. Rodriguez
(74) *Attorney, Agent, or Firm* — Harness, Dickey & Pierce, P.L.C.

(57) ABSTRACT

Example embodiments relate to a component support device for supporting components when painting the components, the component support device including at least one support member for supporting one of the components and supported by a substantially vertical support mast. The support mast includes at least one lower portion and one upper portion which can be assembled and disassembled.

1 Claim, 5 Drawing Sheets

SUPPORT APPARATUS FOR PART IN PAINTING PROCESS

The invention concerns the field of painting motor vehicle body parts. In particular, the invention concerns a device for supporting body parts when painting said body parts, a painting installation comprising such a support device, as well as the painting method in such an installation.

Painting motor vehicle parts is often carried out in a paint conveyor, which is an installation in which swing brackets circulate from one station to another. The swing brackets constitute support members for the parts to be painted. These swing brackets are supported on masts. A mast is substantially a slender body. The masts are positioned substantially vertically on frames called sleds. The sleds are positioned on a conveyor and therefore are mobile. They run along the entire paint conveyor: from loading the part onto the swing brackets supported by the masts, through the various paint stations where the primer, base and varnish can be applied to the parts, until they are unloaded at the paint conveyor exit. Generally, before paint is applied, the parts are cleaned and undergo a surface activation stage, for example by flame-treatment. Generally, each sled has two masts.

The swing brackets and the mast comprise a device for supporting the body parts when painting said body parts.

Such a support device is already known in the state of the art, of the type comprising one or more support members (swing brackets), supported by a substantially vertical mast, each support being adapted to support at least one body part.

Usually, a number of body parts are arranged on this support device in order to be painted or flame-treated or cleaned all at the same time in a specific cycle, in particular for productivity purposes.

Loading the parts to be painted onto the mast is done manually or by an operator using a manipulator.

For ergonomic constraints on operators, the maximum height at which the parts can be loaded onto the swing brackets attached to the masts is 170 cm. Thus, the disadvantage of the existing system is that the loading height limits the load capacity of the paint conveyor. However, the paint conveyors already in use, and in particular the paint robots, could allow usable heights well above 170 cm.

To resolve this height access problem, the conveyor could be set for different levels. However, such a solution would be very costly in terms of civil engineering and the space required (two levels for hanging the parts and swing brackets).

Therefore, at this time, there are no satisfactory solutions for reaching higher levels. Due to this fact and because speeding up production is not possible, the number of paint conveyors would have to be doubled. However, such a solution is unthinkable from an industrial standpoint, due in particular to the investment required.

Furthermore, there is a tendency for certain body parts, specifically bumper skins, to be made with larger and larger surface areas, such that fewer and fewer body parts can fit on one support device due to overcrowding. In essence, the spacing between parts cannot be reduced because the areas to be painted must remain accessible.

This results in reduced production capacity, since a large number of body parts can no longer be painted at the same time, inasmuch as they are supported by a traditional support device.

The object of the invention, in particular, is to remedy this disadvantage by providing a support device that allows a large number of body parts to be painted during one single passage through a paint conveyor station (for example, 4 bumpers on the same side of the mast, thus potentially 8 bumpers if swing brackets are used on both sides of one device), even for large surfaces such as bumper skins. The invention achieves this by means of a mast that can be disassembled into two half-masts or, in general, a mast consisting of two parts, capable of being uncoupled/coupled by an automatic process (for example, a robot). Such a mast can thus also reach a height greater than the ergonomic loading height (170 cm) in the automation area (cleaning, flame-treatment, painting, desolvation, baking, oven, etc.), and a height not exceeding this ergonomic loading height in the area where manual work is done (loading, unloading parts, and all other stages requiring participation of an operator, such as quality control or changing the swing brackets or the masts to adapt them to other types of parts).

Therefore, the object of the invention concerns a device for supporting body parts when painting said body parts, comprising at least one support member for supporting one of the body parts and supported by a substantially vertical mast, where the mast comprises a lower part and an upper part, capable of being assembled and disassembled.

The ability to put more parts on one mast, loading it higher, allows for an increase in the production capacity of the paint conveyors.

By adjusting the size of the two pieces of the mast, it then becomes possible to improve operational ergonomics when loading and unloading parts and to improve the quality of these operations via more accessible measuring positions.

The system may further comprise one or more of the following characteristics, taken alone or in combination:
  The height of the lower part and the upper part are substantially equal once they are mounted on a sled;
  The lower part and the upper part have loading heights less than or equal to 170 cm, once they are mounted on a sled in an installation;
  The lower part and/or the upper part comprises at least one component to obtain a robust fitting between the two parts, in order to guarantee a repeatable position of the upper part on the lower part;
  The lower part and/or the upper part comprise at least one extension;
  The lower part and/or the upper part comprise at least one guiding and reinforcing component of the fitting;
  The guiding and reinforcing component is dimensioned to prevent the upper part from falling when the load is unbalanced;
  The guiding and reinforcing component is a fixed bar, internal or external to one of the lower or upper parts, and it is about 20% longer than the other part;
  The support device comprises at least one lower support member and at least one upper support member; the lower part supports the lower support member, and the upper part supports the upper support member.

The invention also concerns a painting installation comprising an assembly of support members for supporting body parts, circulating on sleds through a sequence of stations, wherein each support member is arranged on a lower or upper part of a mast, forming, with at least one of the support members, a support device according to one of the above [sic] claims.

The installation can comprise an assembly station in which a robot assembles the upper part to the lower part of each mast.

According to the invention, the installation may comprise a disassembly station in which a robot disassembles the upper part from lower part of each mast.

The installation can also comprise a circuit to move the sleds without a mast, from the assembly station to the disassembly station.

The invention also relates to a method of painting body parts, where an installation according to the invention is used. According to this method, the following stages can be carried out:

The parts to be painted are loaded on the support members supported by a lower part or an upper part of a mast;

The upper part is joined to the lower part of each mast by means of a robot;

The parts are painted on the paint conveyor;

The upper part is disassembled from the lower part of each mast by means of a robot; and then, The painted parts are removed from the support members.

The invention will be more easily understood by consulting the appended figures, which are provided by way of example without being limited thereto, wherein:

FIGS. 1A and 1B schematically show an example of component support device 10 of the components 20 according to the invention;

Figure 1A:
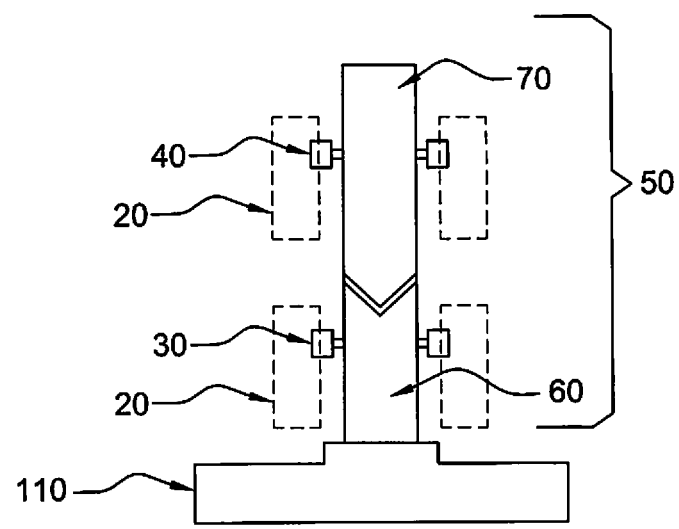
Figure 1B:
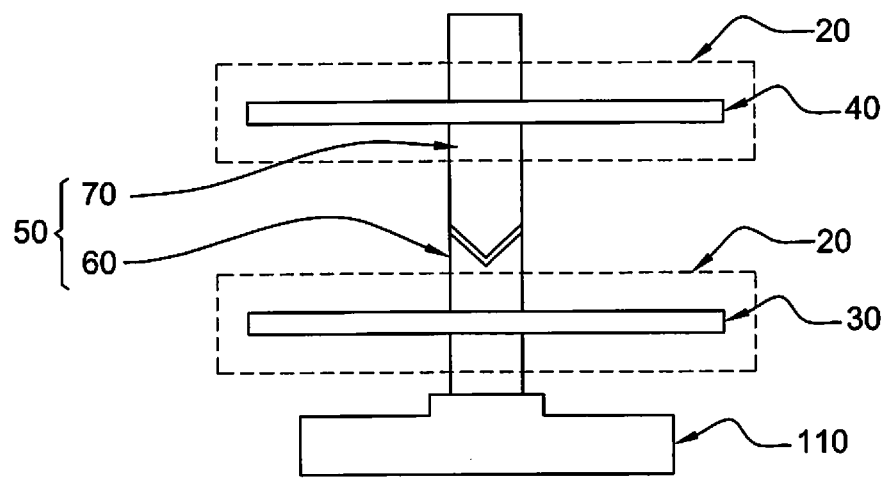

FIGS. 1A and 1B show schematically an example of the component support device 10 supporting the components 20 according to the invention, when painting said body parts. FIG. 1A presents a front view of the component support device 10, and FIG. 1B presents a side view of the component support device 10. In these Figures, the component support device 10 is mounted on a dolly 110.

In the example of FIGS. 1A and 1B, the component support device 10 comprises two support members 30 and 40, for supporting one of the components 20. These support members 30 and 40 are supported by a substantially vertical support mast 50.

Figure 8:
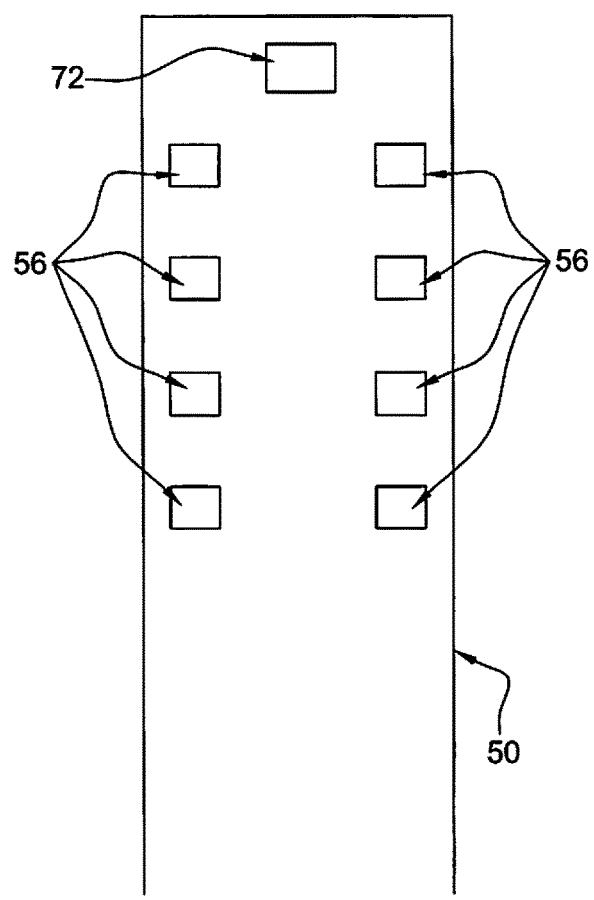
FIG. 8 shows the top of an upper part of a mast.

To this end, the support mast 50 comprises means for carrying the support members 30 and 40. As shown in FIG. 8, these could consist of orifices 56 in the support mast 50.

Figure 2:
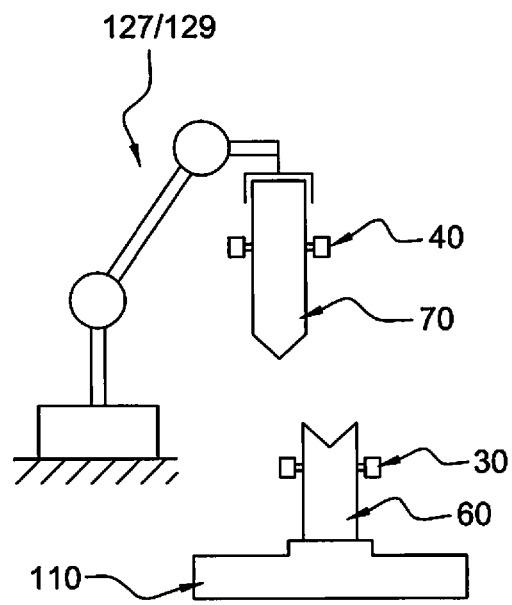
FIG. 2 shows the use of a robot to assemble and disassemble an upper part and a lower part of the mast.

The support mast 50 comprises at least two parts, one lower portion 60 and one upper portion 70, both capable of being assembled and disassembled, in particular using robots (127 or 129) as shown in FIG. 2.

Figure 3:
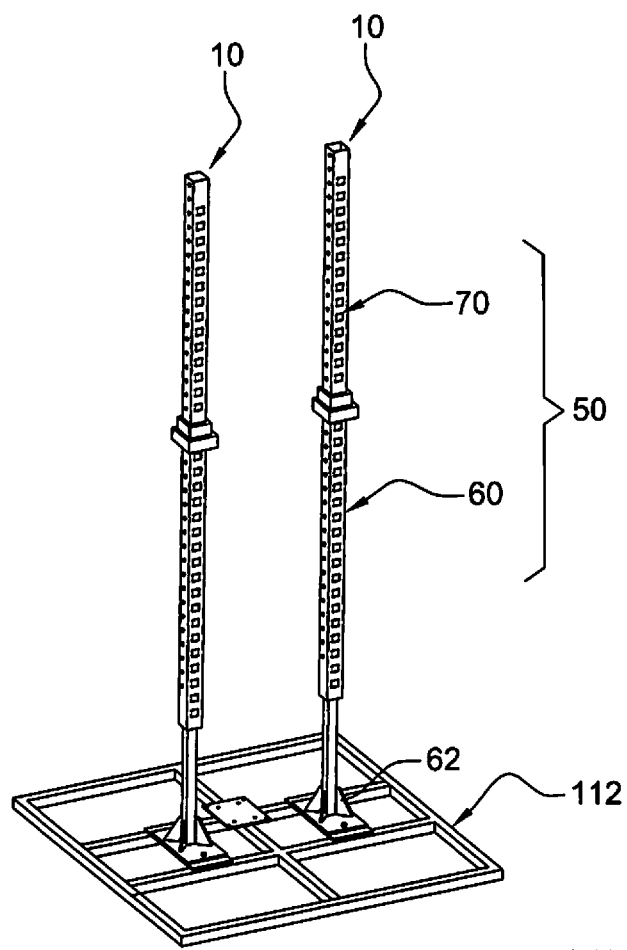
FIG. 3 shows two support devices of parts mounted on a sled.
Figure 4:
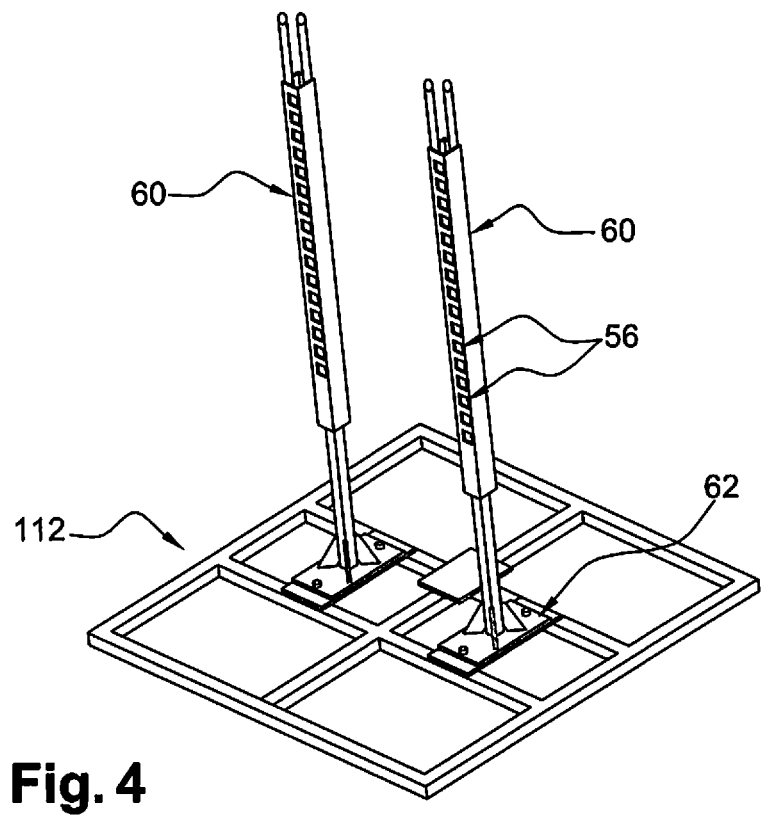
FIG. 4 shows two lower parts of the mast attached to a sled.
Figure 5:
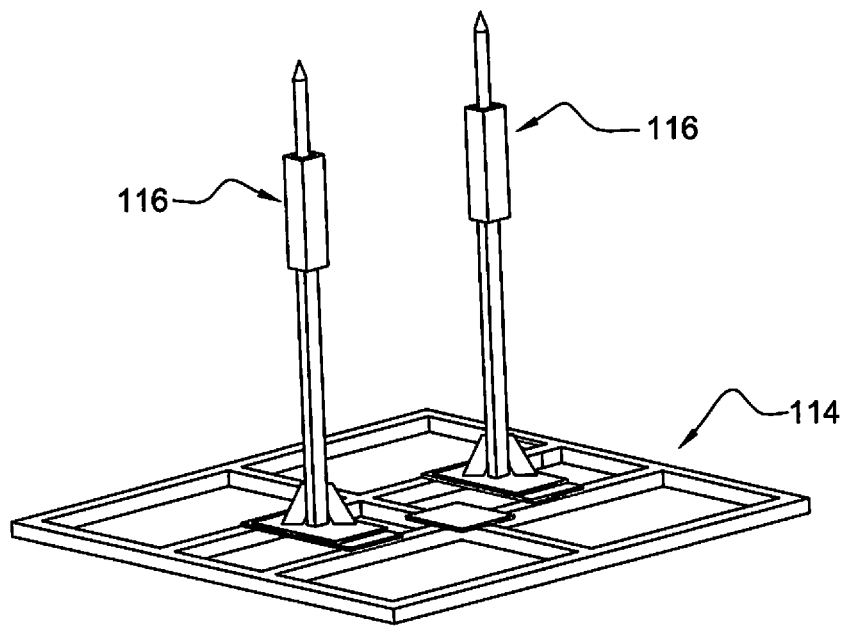
FIG. 5 shows a sled to accept the two upper parts of the mast.

We will now describe in detail a specific example of an embodiment by means of FIGS. 3 to 5.

FIG. 3 shows two component support devices 10 of the components 20 mounted on the dolly 110.

The lower portion 60 of a support mast 50 comprises the fasteners 62 on a dolly 110 (FIGS. 3 and 4). The upper portion 70 of a support mast 50 comprises fitting devices 116 on a dolly 110 (FIG. 5). The dollies 110 may also comprise complementary fasteners to accept the lower portion 60 and the upper portion 70. The dollies 110 may be of the same type for the lower portion 60 and the upper portion 70 of a support mast 50, or of two different types:

The dollies 112 (FIG. 4) for receiving the lower portion 60 of the support mast 50; preferably, the fastener between the lower portion 60 and the dolly 112 will be of a permanent type, such as bolting, welding, etc.

The dollies 114 (FIG. 5) for receiving the upper portion 70 of a support mast 50; preferably, the upper portion 70 will be fastened to the dolly 114 by a fitting, for example the same type of fitting as the one between the lower portion 60 and the upper portion 70 of the support mast 50.

FIG. 4 shows two lower portions 60 of the support mast 50 attached to a dolly 112. The fasteners 62 for the dolly 112 are bolts.

FIG. 5 shows a dolly 114 for accepting two upper portions 70 of the support mast 50. The dolly 114 comprises two fitting devices 116 to connect to the upper portions 70.

We shall now describe in detail the fitting of the lower portion 60 and the upper portion 70 of a support mast 50. Another option for assembly would be reversible, such as using screws, for example.

The lower portion 60 and/or the upper portion 70 comprises at least one fitting component 52 and/or 54 to obtain a strong fitting between the two parts 60, 70, in order to guarantee a repeatable position of the upper portion 70 on the lower portion 60. The fitting component is sized to prevent the upper portion 70 from falling when the load is unbalanced.

The fitting component 52 and/or 54 can be selected alone or in combination of the following components:

i. At Least One Guiding and Reinforcing Fitting Component 54

To allow for better stability of the upper portion 70 once it is joined with the lower portion 60, in particular when the support mast 50 supports the components 20, the lower portion 60 and/or the upper portion 70 comprising at least one guiding and reinforcing fitting component 54, such as a rod or an index finger. This fitting component 54 can be internal or external. For example, the upper part 60 can support a rod 54 inside its cross-section, and another rod 54 outside its cross-section.

Figure 6A:
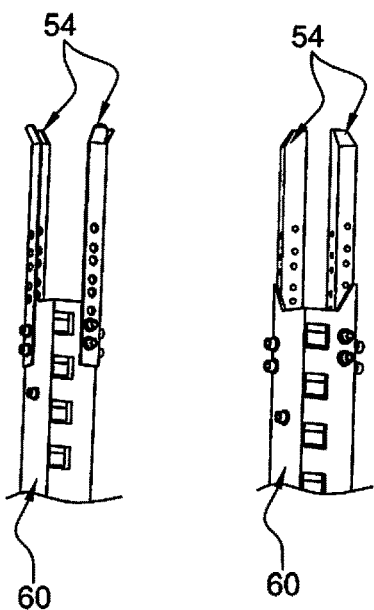
FIG. 6A shows the top of a lower part of a mast and shows an example of positioning the rods serving as a guiding and reinforcing component.
Figure 6B:
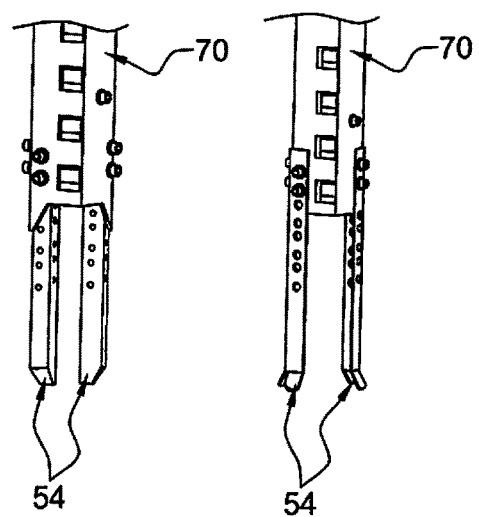
FIG. 6B shows the bottom of an upper part of a mast and shows an example of positioning the rods serving as a guiding and reinforcing component.
Figure 7:
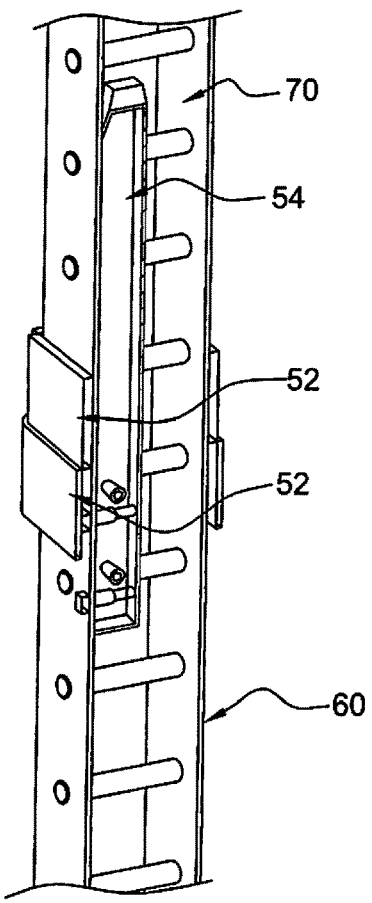
FIG. 7 shows a cross-section of a fitting of an upper part on a lower part.

FIGS. 6A, 6B and 7 show the positioning of these rods 54. For parts 60 and 70 with square hollow profiles, the rods 54 are preferably arranged on a diagonal.

Preferably, the rods 54 are attached internally to the lower portion 60 of the support mast 50 to limit the torque brought to bear on the area of the fitting of the support mast 50 in case the rod tilts or there is a lever effect on the component 20 positioned on a support member 40. According to one embodiment of a component support device 10, adapted to support 4 vehicle bumpers, the rod 54 supported by the lower portion 60 measures approximately 23 cm, while the upper portion 70 measures 110 cm (approximately 21%).

ii. At Least One Fitting Component 52 of Either Section

According to an embodiment shown in FIG. 7, the upper portion 70 comprises two fitting components 52 in order to partially cover the lower portion 60. Such a fitting component 52 covers the fasteners of the guiding and reinforcing fitting components 54. Such a fitting component 52 can also help prevent the paint from penetrating inside the fitting. This reduces maintenance, such as cleaning the masts. Finally, such a fitting component 52 allows greater mechanical strength since the part encircles the profile of the upper part of the mast.

iii. Adjusted Sections

The sections of the lower portion 60 and upper portion 70 are dimensioned to allow for either of the parts to be inserted into the other. In FIG. 3, the lower portion 60 is inserted into the upper portion 70 of the support mast 50. However, it should be noted that according to the invention, the lower portion 60 may be fitted into the upper portion 70, or conversely, the upper portion 70 may be fitted into the lower portion 60.

According to a preferred embodiment, the fitting component consists of a guiding and reinforcing fitting component 54, and, optionally, it comprises at least one fitting component 52 of either of the sections.

According to one preferred embodiment, the component support device 10 comprises at least one lower support member 30 and at least one upper support member 40, and the lower portion 60 supports the lower support member 30, and the upper portion 70 supports the upper support member 40.

According to one embodiment, the height of the lower portion 60 and the upper portion 70 are substantially equal once they are mounted on their sleds.

Preferably, the lower portion 60 and the upper portion 70 have loading heights less than or equal to 170 cm, once they are mounted on their dollies (110, 112, 114) in an apparatus 100.

Preferably, the top of the upper portion 70 includes an orifice 72 which can interact with a marker on the robotic manipulator in order to facilitate the lifting action of the upper portion 70.

In the case of a component support device 10 for supporting the components 20 comprising two support masts 50, the robotic manipulator is equipped with a gripper which can simultaneously lift the two support masts 50 while adjusting the relative position of these two support masts 50, so that the components 20 are transported without damage or deformation.

The invention also concerns a painting apparatus 100 comprising an assembly of support members 30, 40 supporting the components 20, circulating on the dollies 110 (112 and 114) through a series of stations.

The apparatus 100 uses component support devices 10 according to the invention. Thus, each support member 30, 40 is located on a lower portion 60 or upper portion 70 of a support mast 50 forming, with at least one of the support members 30, 40, a component support device 10 according to the invention.

The apparatus 100 comprises an area 102 where operators perform manual work, and a work area without operators, the painting process line 104.

Figure 9:
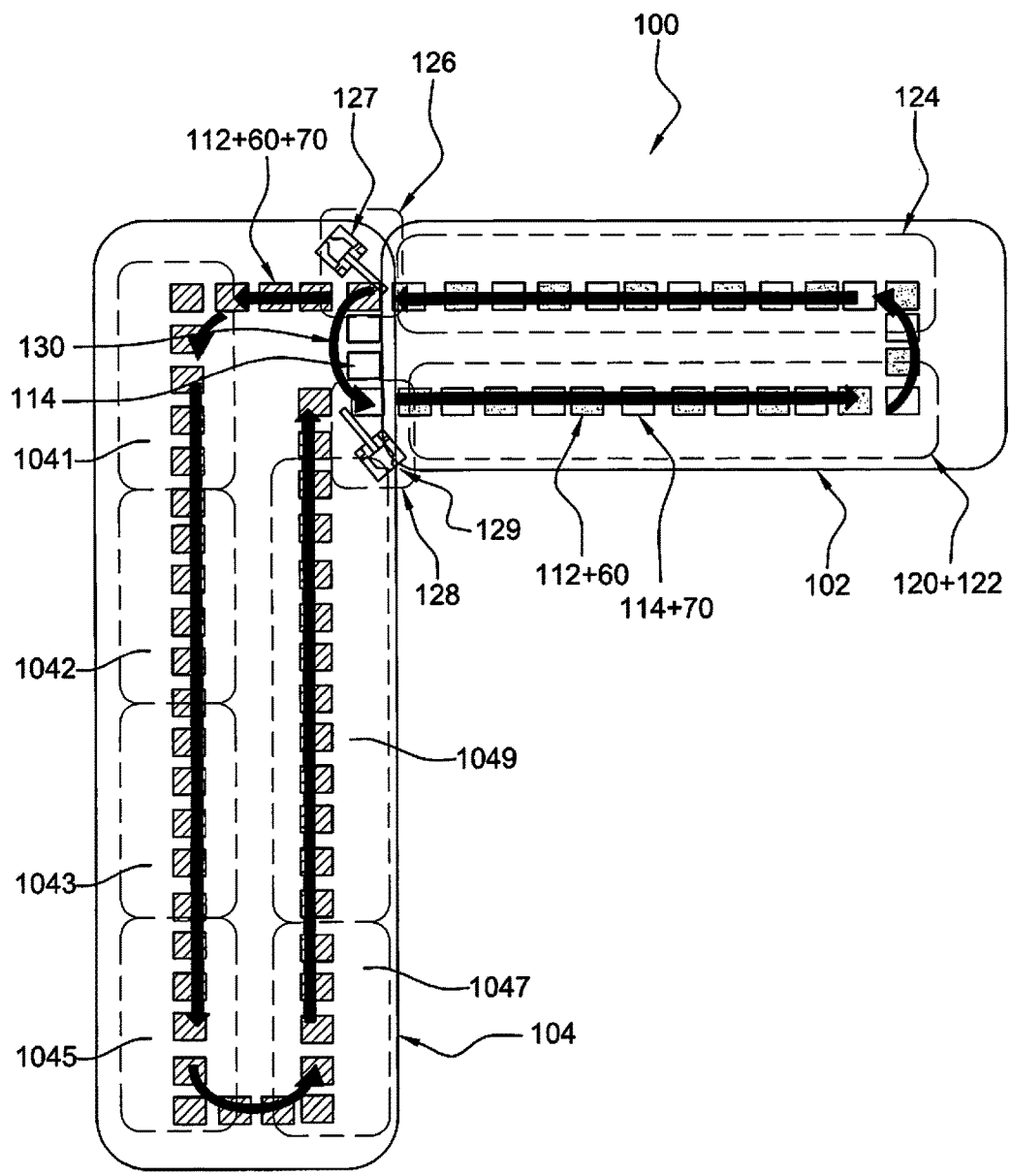
FIG. 9 shows schematically an example of the installation according to the invention.

As shown in FIG. 9, after the disassembly station 128, in which a robot 129 disassembles the upper portion 70 from the lower portion 60 of each support mast 50, the manual work area 102 includes the following sequential stations:

- The control station 120 for the components 20 exiting the painting process line 104;
- The unloading station 122 for the then-painted components 20, where the components 20 are removed from their support members 30, 40;
- An optional station for potentially changing the support members 30 and 40, in case of a change in the production sequence;
- The loading station 124 for the components 20 to be painted on the support members 30, 40, supported by a lower portion 60 or an upper portion 70 of a support mast 50.

After the manual work area 102, the apparatus 100 comprises assembly station 126, in which a robot 127 assembles the upper portion 70 to the lower portion 60 of each support mast 50.

The assembled support masts 50 then enter the painting process line 104 without operators, i.e., the paint conveyor which can, for example, comprise a sequence of the following stations:

- A surface treatment station (cleaning station 1041 and flaming station 1042);
- A primer application station 1043;
- A desolvation (and baking, if necessary) station;
- A base paint application station 1045;
- A desolvation (and baking, if necessary) station;
- A varnish application station 1047;
- A desolvation station;
- A curing station 1049.

Each lower portion 60 and upper portion 70 of the support mast 50 is positioned on carriages called dollies 110 in order to pass through all the stations.

Preferably, the two types of sleds described above will be used: the dollies 112 for receiving the lower portion 60, and the dollies 114 for receiving the upper portion 70.

When these two parts are assembled, the dollies 114 are left unloaded. This is because the painting apparatus 100 comprises a conveyor circuit 130 to reintroduce the dollies 114 without a mast (without an upper portion 70), from the assembly station 126 to the disassembly station 128.

The invention also concerns a method of painting components 20 in which an installation according to the invention is used. The method comprises the following stages:

- The components 20 to be painted are loaded on the support members 30, 40 supported by a lower portion 60 or an upper portion 70 of a support mast 50;
- The upper portion 70 is attached to the lower portion 60 of each support mast 50 by means of a robot 127;
- The components 20 are painted in the painting process line 104;
- The upper portion 70 is detached from the lower portion 60 of each support mast 50 by means of a robot 129; and then
- The painted components 20 are thus removed from the support members 30, 40.

A preferred embodiment would set up a quality control stage of the thus-painted components 20 at the exit of the painting process line 104.

The invention is not limited to the embodiments presented, and other embodiments will be apparent to a person skilled in the art. In particular, it is possible for the mast to consist of more than two parts nested in one another, and one or more robots can stack several parts of the mast in succession.

LIST OF REFERENCE NUMERALS

10: Component support device in painting apparatus
20: Component
30: Support member configured to support a component 20
40: Support member configured to support another component 20
50: Support mast supporting at least one of support member 30 or 40
52: Fitting component configured to robustly couple lower portion 60 and upper portion 70 of the support mast 50

54: Fitting component for robust coupling on the lower portion 60 and/or the upper portion 70 of the support mast 50, the fitting component 54 constituting a guiding and reinforcing element
56: Mast opening configured to receive support members 30 and 40
60: Lower portion of support mast 50
62: Fixing member for the lower portion 60
70: Upper portion of support mast 50
72: Mast opening configured to facilitate lifting of the support mast 50
100: Painting apparatus
102: Manual handling (operation) area
104: Painting process line
    1041: Cleaning station
    1042: Flaming station
    1043: Primer application station
    1045: Base application station
    1047: Varnish application station
    1049: Curing (heating) station
110: Dolly (trolley)
112: Dolly configured to receive the lower portion 60
114: Dolly configured to receive the upper portion 70
116: Fitting device configured to fit the upper portion 70 to the dolly 114
120: (Quality) Control station for components 20 leaving the painting process line 104
122: Unloading station for painted components 20
124: Loading station for components 20 to be painted on support members 30 and 40
126: Assembly station where a robot 127 affixes the upper portion 70 on the lower portion 60 in each support mast 50
127: Robot of assembly station 126
128: Disassembly station, where robot 129 disassembles the upper portion 70 from the lower portion 60 in each support mast 50
129: Robot of disassembly station 128
130: Conveyor circuit configured to transfer dollies 114 without the upper portion 70 from assembly station 126 to disassembly station 128

The invention claimed is:

1. A method for painting one or more components using a painting apparatus, the painting apparatus including an assembly of support members configured to support the one or more components and to move on one or more dollies through a series of stations, each support member of the assembly of support members being located on a lower portion of a substantially vertical support mast or an upper portion of the substantially vertical support mast, the lower portion of the substantially vertical support mast and the upper portion of the substantially vertical support mast being configured to be assembled and disassembled, the substantially vertical support mast forming, with at least one support member of the assembly of support members, a component support device when painting said one or more components, the method comprising:
    loading the one or more components to be painted on one or more support members of the assembly of support members supported by the lower portion of the substantially vertical support mast or the upper portion of the substantially vertical support mast;
    attaching the upper portion of the substantially vertical support mast to the lower portion of the substantially vertical support mast via a first robot;
    painting the one or more components on a painting process line;
    detaching the upper portion of the substantially vertical support mast from the lower portion of the substantially vertical support mast via a second robot; and
    removing the painted one or more components from the one or more support members of the assembly of support members.

* * * * *

UNITED STATES PATENT AND TRADEMARK OFFICE
CERTIFICATE OF CORRECTION

PATENT NO. : 10,507,486 B2  
APPLICATION NO. : 15/471536  
DATED : December 17, 2019  
INVENTOR(S) : Treese et al.

Page 1 of 1

It is certified that error appears in the above-identified patent and that said Letters Patent is hereby corrected as shown below:

On the Title Page

Item (71) should read: Compagnie Plastic Omnium, Lyon (FR)

Item (73) should read: Compagnie Plastic Omnium, Lyon (FR)

Signed and Sealed this  
Twenty-fourth Day of November, 2020

Andrei Iancu  
*Director of the United States Patent and Trademark Office*